(12) United States Patent  
Kudo et al.

(10) Patent No.: US 8,005,960 B2  
(45) Date of Patent: Aug. 23, 2011

(54) NETWORK CONNECTION MANAGEMENT APPARATUS DEVICE, AND SYSTEM FOR CONNECTING NEW NETWORK DEVICE

(75) Inventors: Yoshimichi Kudo, Fujisawa (JP); Mayuko Tanaka, Yokohama (JP)

(73) Assignee: Hitachi, Ltd., Tokyo (JP)

(*) Notice: Subject to any disclaimer, the term of this patent is extended or adjusted under 35 U.S.C. 154(b) by 183 days.

(21) Appl. No.: 11/897,715

(22) Filed: Aug. 30, 2007

(65) Prior Publication Data

US 2008/0005309 A1    Jan. 3, 2008

Related U.S. Application Data

(63) Continuation of application No. 10/290,004, filed on Nov. 6, 2002, now abandoned.

(30) Foreign Application Priority Data

Dec. 27, 2001    (JP) .................................. 2001-395712

(51) Int. Cl.  
*G06F 15/16* (2006.01)

(52) U.S. Cl. ....................................... 709/227; 709/225

(58) Field of Classification Search ........................ None  
See application file for complete search history.

(56) References Cited

U.S. PATENT DOCUMENTS

| | | |
|---|---|---|
| 5,382,951 A | 1/1995 | White et al. |
| 5,467,263 A | 11/1995 | Gilbert |
| 5,557,748 A | 9/1996 | Norris |
| 5,953,012 A | 9/1999 | Veghte et al. |
| 5,983,353 A | 11/1999 | McHann, Jr. |
| 6,052,727 A | 4/2000 | Kamalanathan |
| 6,088,451 A | 7/2000 | He et al. |
| 6,381,631 B1 * | 4/2002 | van Hoff ........................ 709/227 |
| 6,411,802 B1 | 6/2002 | Cardina et al. |
| 6,470,453 B1 * | 10/2002 | Vilhuber ........................ 709/229 |
| 6,539,482 B1 * | 3/2003 | Blanco et al. ..................... 726/7 |
| 6,546,425 B1 | 4/2003 | Hanson et al. |

(Continued)

FOREIGN PATENT DOCUMENTS

EP    0812086 A2    12/1997

(Continued)

OTHER PUBLICATIONS

Hac, Anna et al. "A Scalable Mobile Host Protocol for the Internet." International Journal of Network Management. vol. 10, Issue 3. May 2000. John Wiley & Sons, Inc. 115-134.*

*Primary Examiner* — Jeffrey R Swearingen  
(74) *Attorney, Agent, or Firm* — Kilpatrick Townsend & Stockton LLP (57) ABSTRACT

The present invention is intended to simplify the user's initial setup operation when connecting a new network device to a network in his/her house/room, and further to prevent connection of a network device that is unknown to that user. A network connection management device, when receiving a network connection request from a new network device, sends the request to other network devices connected already to the network. The request then is displayed on each respective displaying means in order to prompt the user to confirm the request. The confirmation data inputted by the user through the inputting means of any of these network devices is sent to the network connection management device, which then determines whether to permit the connection to said network. When the decision result is "YES" (permit), the new network device is connected to the network.

4 Claims, 6 Drawing Sheets

U.S. PATENT DOCUMENTS

| | | | |
|---|---|---|---|
| 6,944,664 B1 * | 9/2005 | Chantrain et al. | 709/227 |
| 7,577,725 B1 * | 8/2009 | Sitaraman et al. | 709/221 |
| 2002/0083344 A1 | 6/2002 | Vairavan | |
| 2002/0194344 A1 * | 12/2002 | Nishikawa | 709/227 |
| 2002/0198943 A1 * | 12/2002 | Zhuang et al. | 709/227 |
| 2004/0003046 A1 * | 1/2004 | Grabelsky et al. | 709/227 |

FOREIGN PATENT DOCUMENTS

| | | |
|---|---|---|
| JP | 10-247965 | 9/1998 |
| JP | 2001-086231 | 3/2001 |
| WO | WO97/09800 A2 | 3/1997 |
| WO | WO01/22661 A2 | 3/2001 |

* cited by examiner

NETWORK CONNECTION MANAGEMENT APPARATUS DEVICE, AND SYSTEM FOR CONNECTING NEW NETWORK DEVICE

CROSS-REFERENCE TO RELATED APPLICATION(S)

This is a continuation of U.S. patent application Ser. No. 10/290,004, filed on Nov. 6, 2002, abandoned as of Nov. 29, 2007, which application claims priority from Japan Patent Application No. 2001-395712, filed Dec. 27, 2001, the entire disclosure of which is incorporated herein by reference.

BACKGROUND OF THE INVENTION

The present invention relates to network devices and methods for connecting a new network device to a network. In particular, the present invention relates to easy connections of a network device to a general home network and the prevention of devices unknown to the user from connecting to the network.

Along with the rapid spread of personal computers (PCs) and increase in demand for connecting those PCs to the Internet, many general home PC users are beginning to install a home network in order to share access to the Internet and exchange data among a plurality of PCs. In recent years, the development of home electrical appliances such as AV apparatus, refrigerators, washing machines, etc., has allowed, and made it popular to, connect those appliances to the Internet in order to obtain information therefrom and/or enable cooperative appliance operations through remote controlling or through the Internet.

Generally, to build up a general home network, the user can use an access medium such as any of a CSMA/CD method LAN (as are employed widely in offices, school campuses, etc.), a wireless LAN, and/or another networks that require no wiring, or running of power lines or telephone lines, so as to simplify the installation and prevent the need for any additional construction. In other words, the user utilizes Internet Protocol (IP), as is widely employed over the Internet as a protocol common for various types of media, to assign an IP address to each device connected to the Internet, so as to be able to exchange data as IP packets regardless of the media to which the devices are actually connected.

When a new device is to be connected to such a network, a unique IP address is assigned to the device so as to avoid duplication of the address among devices. When the device is also to be used at home, the device should be installed easily without the need for a complicated initial setup process. In order to meet these demands, the Dynamic Host Configuration Protocol (DHCP) is widely used for connecting a new device to a network, whereby an IP address is automatically assigned to the new device by a server on the network. A next generation IP protocol (IPv6) provides and regulates another method for automatically setting an IP address by combining the upper bits in the address, given from a router through a stateless auto-configuration process, and the lower bits in the address.

The automatic setting of IP addresses can save significant amounts of time and labor for a user. When a wireless LAN or land line is used as an access medium, however, unexpected problems might occur. For example, a device that is unknown to the user might be connected by any person, either intentionally or by mistake, from outside the user's house through a wireless port or AC outlet provided on the outer wall of the user's house, or from a room that is adjacent to the room in which the user lives (such as in a housing complex or an apartment building).

In order to prevent the unexpected connection of a device to such a network, the network can be controlled so that the user is authorized each time there is an attempt to connect a new device to the network. The official gazettes of JP-A No. H10-247965 and JP-A No. 2000-86231 have disclosed methods that enable a new communication terminal (slave) to easily be connected to a network, such as where the terminal is to be registered at a cordless telephone or wireless communication terminal. The user can operate the slave and master terminals simultaneously or alternately during the connection.

In the prior art technique described above, the user is requested to operate the buttons of both terminals for communications (between master and slave terminals), either simultaneously or alternately. If a similar operation is employed to connect a new device to a network, the user will be required to perform the operation between the server or router and the terminal to be connected, either simultaneously or alternately. The new network device and the server/router are not always installed close to each other in a user's house or room. In some cases, the network device is installed on a first floor while the server/router is installed on the second floor, etc. In such a case, the user will be forced to move from the first floor to the second floor or from the second floor to the first floor to operate both of the devices to connect the new network device. The work will thus become very troublesome. In addition, when a network device unknown to the user is connected by any other person, the confirmation message is displayed only on the server/router screen. Therefore, the user will not always be able to view the message and be aware of the connection.

SUMMARY OF THE INVENTION

Under such circumstances, it is an object of the present invention to provide a method for simplifying the installation work necessary when a user connects a new device to a home network. It also in an object to prevent the addition of a new device that is unknown to the user, whether intentionally or by mistake, by notifying the user of the attempted connection of each new device.

In order to achieve the above objects, each network device can be provided with "configuration processing means" for initializing its address, "notification receiving means" for receiving a user's notification (for the user's acknowledgement) from the network connection management device when a new network device is to be connected to the network, "decision of acknowledgement means" for receiving a request for a user's acknowledgement from the notification receiving means and sending the request to the displaying means (so as to notify the user of the request), then receiving a user command in response to the request through an inputting means to decide the contents of a response to be returned to the network connection management device; and "response sending means" for receiving the decision result from the decision of acknowledgement means and sending the result to the network connection management device. The network system can be configured with a plurality of network devices, each having terminal functions, as well as at least one network connection management device having server or router functions.

The network connection management device is provided with "decision of permission means" for deciding whether to permit the connection when receiving an address setting request from the new network device, and "displaying means" for displaying the address setting request received from the decision of permission means so as to notify the user of the request, "inputting means" for receiving a user command with respect to the displayed message to transfer the command to the decision of permission means, "notification sending means" for sending the request received by the decision of permission means to a network device other than the new network device, "response receiving means" for receiving a response corresponding to the user command with respect to the request sent to the other network device and sending the response to the decision of permission means, "registration processing means" for registering information related to the new network device permitted to be connected to the network by the decision of permission means, and "device information memory means" for storing the new network device information through the registration processing means.

DESCRIPTION OF THE PREFERRED EMBODIMENTS

Figure 1:
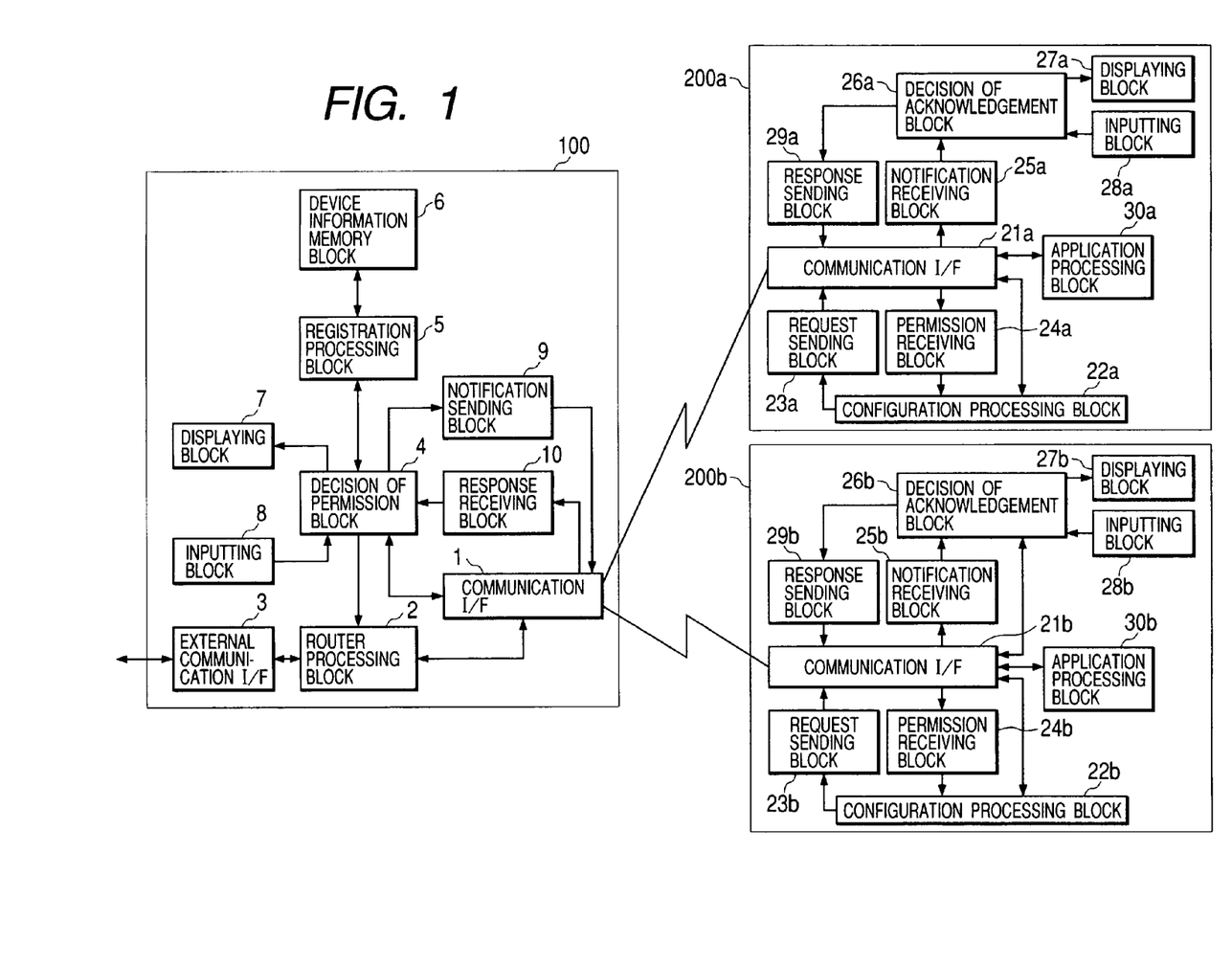
FIG. 1 is a block diagram of a network system configured with a gateway device and two network devices in the first embodiment of the present invention.

Hereunder, a preferred embodiment of the present invention will be described with reference to FIG. 1. FIG. 1 shows a block diagram of a network system in one embodiment of the present invention. The network system is configured with a gateway device 100 and two network devices 200a and 200b. The gateway device 100 functions as a network connection management device in this case.

The gateway device 100 includes a communication interface 1 for connecting the system to a wireless LAN, a router processing block 2 for controlling data transfer between the wireless LAN and an external network, and an external communication interface 3 for connecting the system to an external wide-area network. The gateway device 100 functions as an interface between an internal network, such as a home network, and the external network. The decision of permission block 4 receives a network connection request from a new network device to be connected through the communication interface 1, and displays the connection request message of the new device on the displaying block 7 in order to notify the user of the request. At the same time, the decision of permission block 4 reads the address information of network devices already connected to the network from a device information memory block 6, through a registration processing block 5, and notifies the network devices of the request for a user's acknowledgement through a notification sending block 9. A response receiving block 10 receives responses from the network devices through the communication interface 1, with respect to the request for user's acknowledgement, then sends the responses to the decision of permission block 4. The decision of permission block 4 then determines whether to permit, the connection of the new network device according to the result received from the response receiving block 10, or according to an instruction issued to the connection request inputted to the gateway device 100 directly by the user through the inputting block 8. When the decision result is "YES" (or a decision to permit), the decision of permission block 4 sends a permission for connection and other necessary information to the new network device through the communication interface 1. The decision of permission block 4 also stores the information related to the new network device in the device information memory block 6 through the registration processing block 5, and instructs a router processing block to permit access for the new network device from/to external devices.

A network device is disconnected from a network as follows. When the decision of permission block 4 receives a disconnect request from the network device to be disconnected, the system instructs the registration processing block 5 to delete the network device information from the device information memory block 6. When the power supply for the network device is shut off or the device itself is moved out of the service range, the network device is for all practical reasons disconnected from the network, and no disconnect request is issued from the network device. To detect such a case, therefore, the decision of permission block 4 communicates with the network device periodically in order to confirm that the device is connected to the network. When communication with the device is disabled, the decision of permission block 4 determines that the device is disconnected from the network and adds information that marks this device as deleted to the device information memory block 6, through the registration processing block 5. At this time, the actual deletion of the device information from the device information memory block 6 may be delayed for a certain amount of time so that the deletion is distinguished from a temporary disconnection of the device from the network.

The displaying block 7 may be composed of LEDs or a liquid crystal panel in order to display connection request messages. The block may be any means whereby the user can recognize the displayed messages. The inputting block 8 may have dedicated buttons used for inputting "permit" and "do not permit" options. Those buttons may also be displayed on a liquid crystal panel to select various functions together with the cursor keys and the enter key.

Next, the configurations of the network devices 200a and 200b will be described. In the network devices 200a and 200b, reference symbols 21a and 21b to 20a to 29b denote similar components. The application processing block 30a/30b realizes functions that are specific to the corresponding network device 200a/200b. The network devices 200a and 200b, including those application processing blocks 30a and 30b, may be similar or not similar in function. The present invention is not affected by the similarity/non-similarity. Hereinafter, the configuration of the network device 200a will be described in detail.

The network device 200a is connected to a network (a wireless LAN in this case) through the communication interface 21a, and can send/receive data to/from the gateway 100. When the network device 200a is powered and/or connected newly to the network, the configuration processing block 22a sends a request to the request sending block 23a for information regarding its connection to the network, either automatically or according to user information issued through an operator panel (not shown). The request sending block 23a then sends the request to the object through the communication interface 21a.

The permission receiving block 24a receives the response to the connection request through the gateway device 100 and transfers the response to the configuration processing block 22a. When the connection request denotes "permit", the configuration processing block 22a sets such necessary information as the address of the network device 200a according to the information received from the gateway device 100, whereby the application processing block 30a is able to communicate with network devices already connected to the internal/external network devices, in order to execute predetermined functions. When the connection request denotes "do not permit", the configuration processing block cancels the connection attempt. The user is thus requested to attempt another method, such as manual connection to the network as needed.

When a request for user's acknowledgement is returned in response to a different new connection request for a different new network device from the gateway device 100 after the network device 200a is connected to the network, the notification receiving block 25a receives the request and transfers it to the decision of acknowledgement block 26a, whereby the different new network device connection request message is displayed on the displaying block 27a in order to prompt the user to confirm the requested content. The user thus inputs the acknowledgement through the inputting block 28a and the decision of acknowledgement block 26a determines the content and sends a "permit" or "do not permit" acknowledgement to the gateway device 100, through the response processing block 29a, according to the input of the user. The displaying block 27a and the inputting block 28a may include LEDs and push buttons, just like the displaying block 7 and the inputting block 8 of the gateway device 100. The displaying block 27a may also combine a TV monitor screen display operation and a response through an infrared ray remote control device to notify the user of the message.

Figure 2:
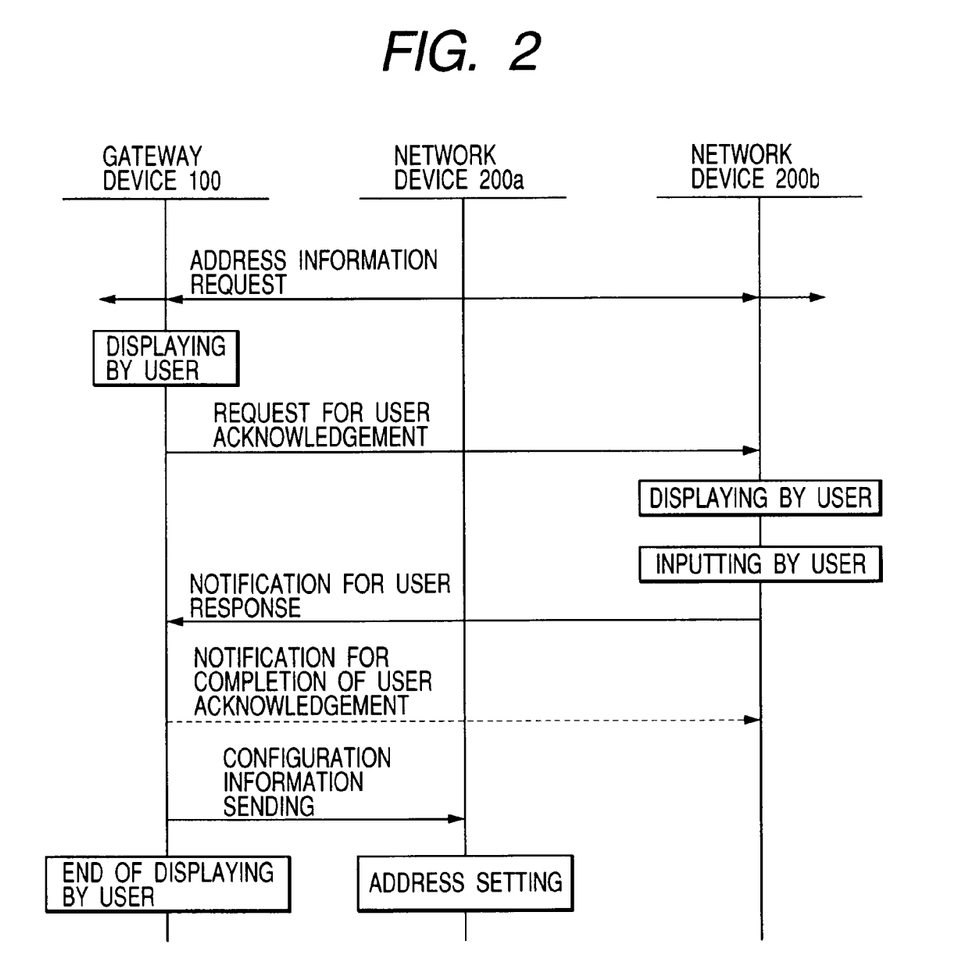
FIG. 2 is an operation sequence for connecting a new network device to the network shown FIG. 1.

Hereinafter, a case in which a new network device 200a is to be connected to the network while the gateway device 100 and the network device 200b are already connected to the network will be described. FIG. 2 shows an operation sequence performed by the gateway device 100 and the network devices 200a and 200b in order to connect the new network device 200a to the network.

In FIG. 2, the network device 200a, while connected to the network, sends information denoting its connection to the network to the router, with use of the multi-casting function, then send a request to the router for information that is required to set its address. The network device then waits for the response from the router. The gateway device 100, when receiving an address setting request from the network device 200a, displays the information denoting the new connection request from the network device 100a on the displaying block 8, and sends a message requesting the user's acknowledgement to the network device 200b. Once message is received, the network device 200b displays the notification message on the displaying block 27b and waits for information to be inputted by the user through the inputting block 28b. The network device 200b assumes the input of the user as the expected response and sends the response to the gateway device 100.

Upon receiving the response from the network device 200b, the gateway device 100 determines the content. When the content denotes "permit", the gateway device 100 sends the necessary information to the network device 200a and cancels the display on the displaying block 7. If the connection acknowledgement request is sent to any network device other than the network device 200b, with use of the multi-casting function, the gateway device 100 notifies the devices that the connection is already confirmed. The network device 200a thus sets necessary information such as its address according to the information received from the gateway device 100. After this, the network device 200a is enabled to send/receive data through the network. When the response from the network device 200b denotes "do not permit", the gateway device 100 sends a "do not permit" message to the network device 200a and cancels the display on the displaying block 7.

Figure 3:
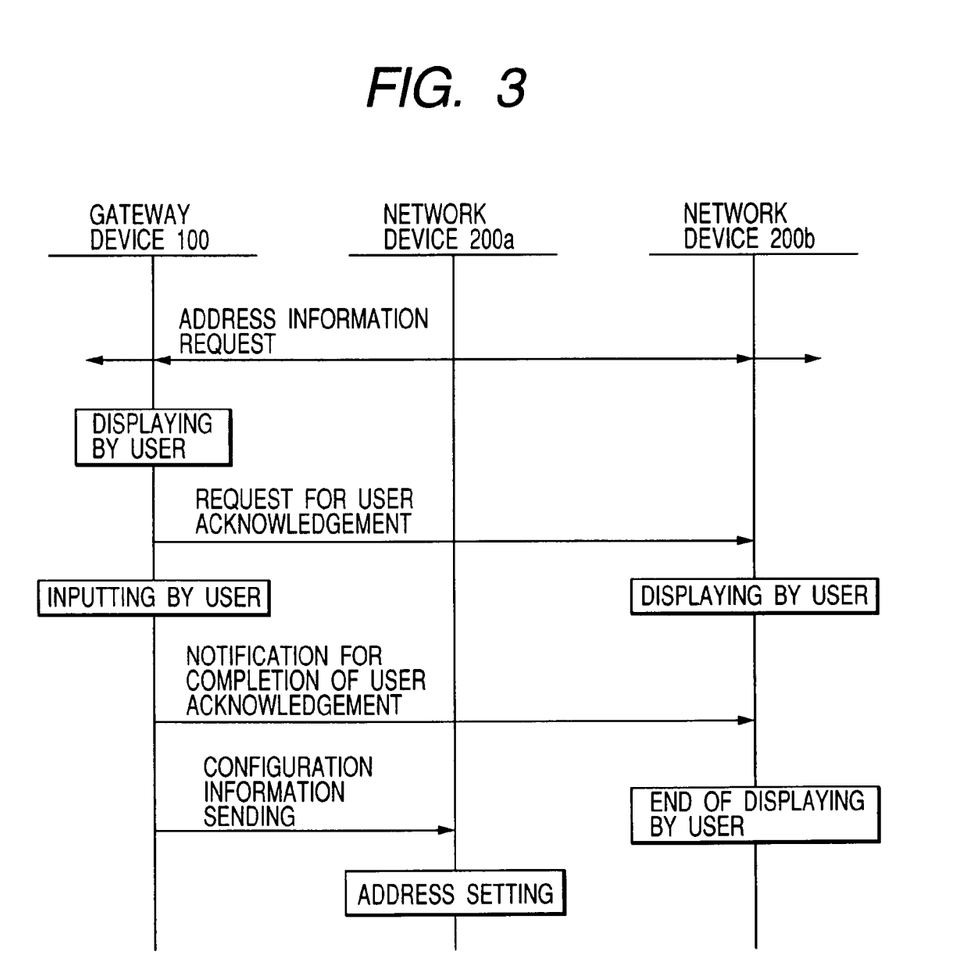
FIG. 3 is another operation sequence for connecting a new network device to the network shown in FIG. 1.

FIG. 3 shows another case in which a new network device 200a is to be connected to the network while the gateway device 100 and the network device 200b are already connected to the network.

In this case, the user sends a message denoting the completion of his/her acknowledgement to the network device 200b, which then cancels the display on the displaying block. The method for sending the information to the network device 200a in this case is completely the same as that in FIG. 2.

If the network device 200a is connected to the gateway device 100 as the first network device, the gateway device 100 refers to the device information memory block 6 to confirm that there is no network device to which the acknowledgement is to be sent. The gateway device 100 thus makes no request for acknowledgement nor notifies any other network device of the completion of the acknowledgement.

Figure 4:
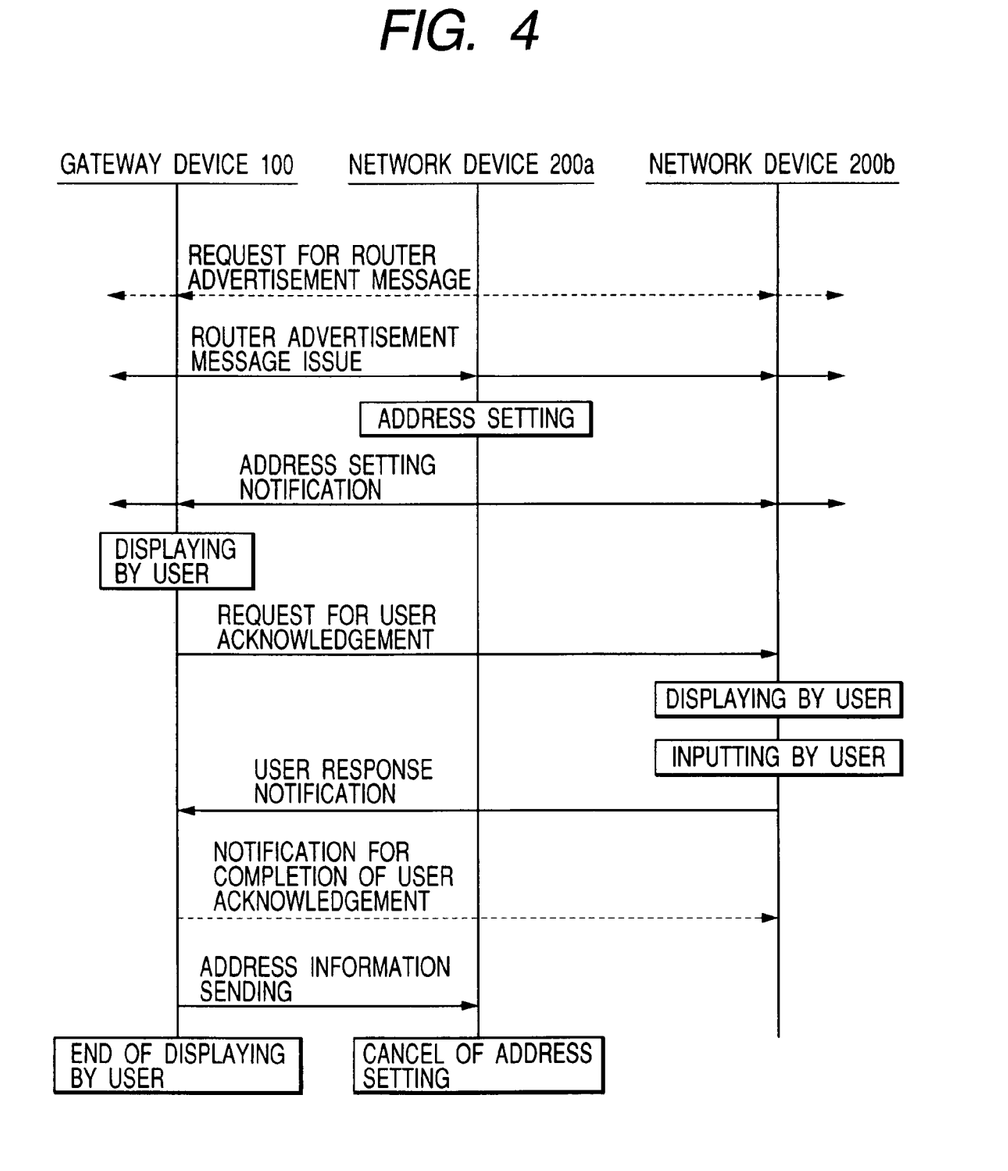
FIG. 4 is still another operation sequence for connecting a new network device to the network shown in FIG. 1.

FIG. 4 shows an operation sequence performed by the gateway device 100 and the network devices 200a and 200b to connect a new device 200a to the network with use of the stateless auto configuration method. Similar to the above example, it is assumed here that the new network device 200a is to be connected to the network while the gateway device 100 and the network device 200b are already connected to the network. In FIG. 4, the network device 200a requests a router advertisement message as needed, and the gateway device 100 sends the router advertisement message to the network with use of the multi-casting method when receiving the router solicitation message (or in a certain time). The network device 200a obtains the upper bits of the network address from the router solicitation message received from the gateway device 100, and combines the bits with the lower bits generated by itself to obtain the new address. The network device 200a then sends this address notification message to the network with use of the multi-casting function. The gateway 100, receiving the address notification message from the network device 200a, displays a message denoting that a new network device is to be connected to the network and sends the request for acknowledgement to the network device 200b.

Upon receiving a message including the request for acknowledgement, the network device 200b displays a message denoting that a new device is to be connected on the displaying block 27b in order to prompt the user to input necessary information through the inputting block 28b. The user's input is sent to the gateway 100 as a response. When the response from the network device 200b denotes "permit", the gateway device 100 sends no information to the network device 200b and cancels the display on the displaying block 7. When the request for acknowledgement is notified to any network device other than the network device 200b with use of the multi-casting function, the gateway device 100 notifies the device of the completion of the user's acknowledgement. When the response from the network device 200b denotes "do not permit", the gateway device 100 notifies the network device 200a that the address cannot be used. The network device 200a, receiving the "do not permit" message, thus cancels the use of the generated address.

Figure 5:
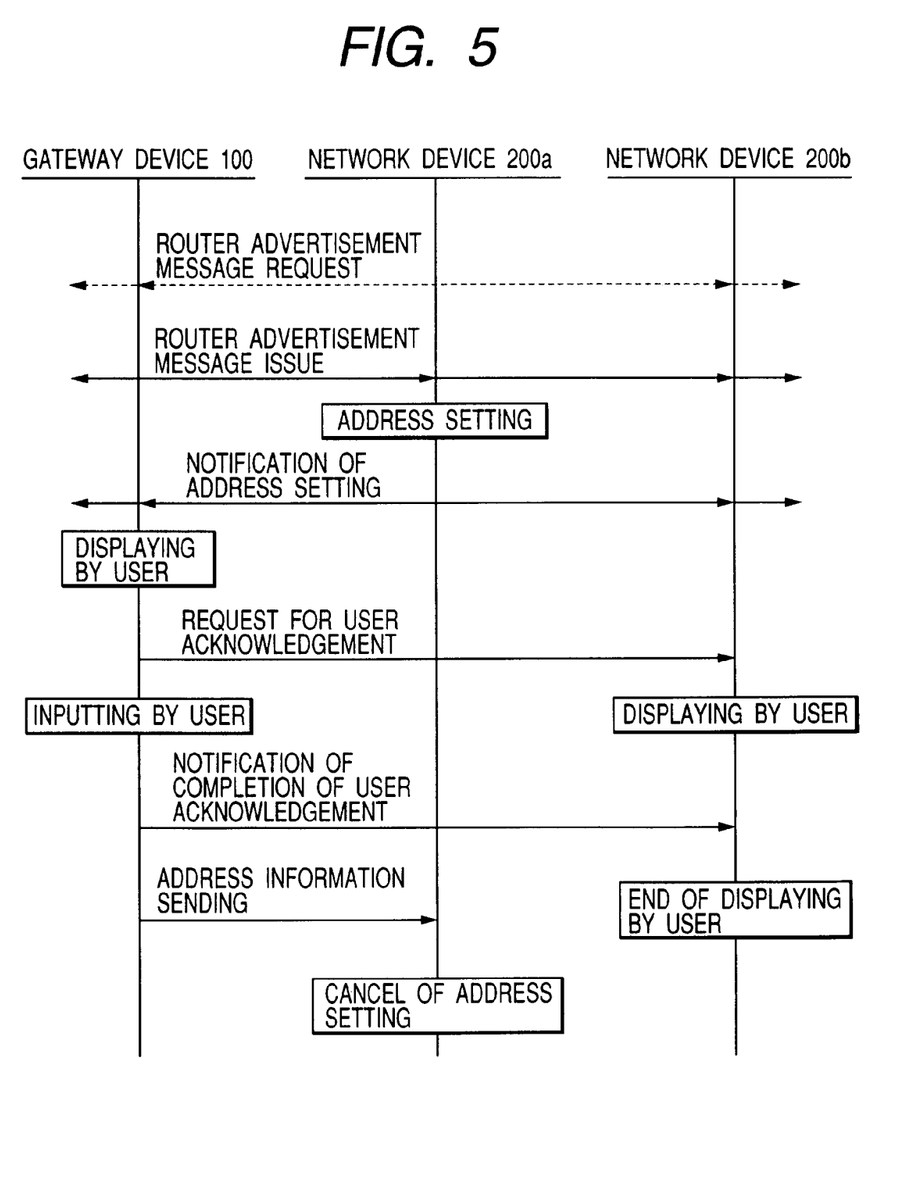
FIG. 5 is still another operation sequence for connecting a new network device to the network shown in FIG. 1.

FIG. 5 shows an operation sequence performed by the user through the inputting block 8 at the gateway device 100 side through stateless auto configuration, as in FIG. 4. The operation sequence in this case is the same as that shown in FIGS. 3 and 4.

As described above, and according to the embodiment of the present invention shown in FIG. 1, when a new network device is to be connected to a network, the user is required to confirm the newly connected network device by, for example, simply pressing a button. There is no need to undertake any other operation, such as complicated setup operation. In addition, when a new network device is to be connected to a network, the user is always requested to take any necessary actions in response to messages displayed on the screen of the gateway device or network device. Thus, there is no need to worry about the unexpected connection of an unknown device to the network, even when the connection is done from outside the user's house/room, either by mistake or intentionally. It is thus always possible for the user to connect a new device to his/her home network through the closest device, such that the user can reduce his/her load as it relates to the acknowledgement of device connections.

Each means of the gateway device and the network devices shown in FIG. 1 may be contained in an independent hardware block. Alternatively, or in addition, the function of each means may be realized by a software program. Which of the above methods is to be employed is left to the device designer.

Figure 6:
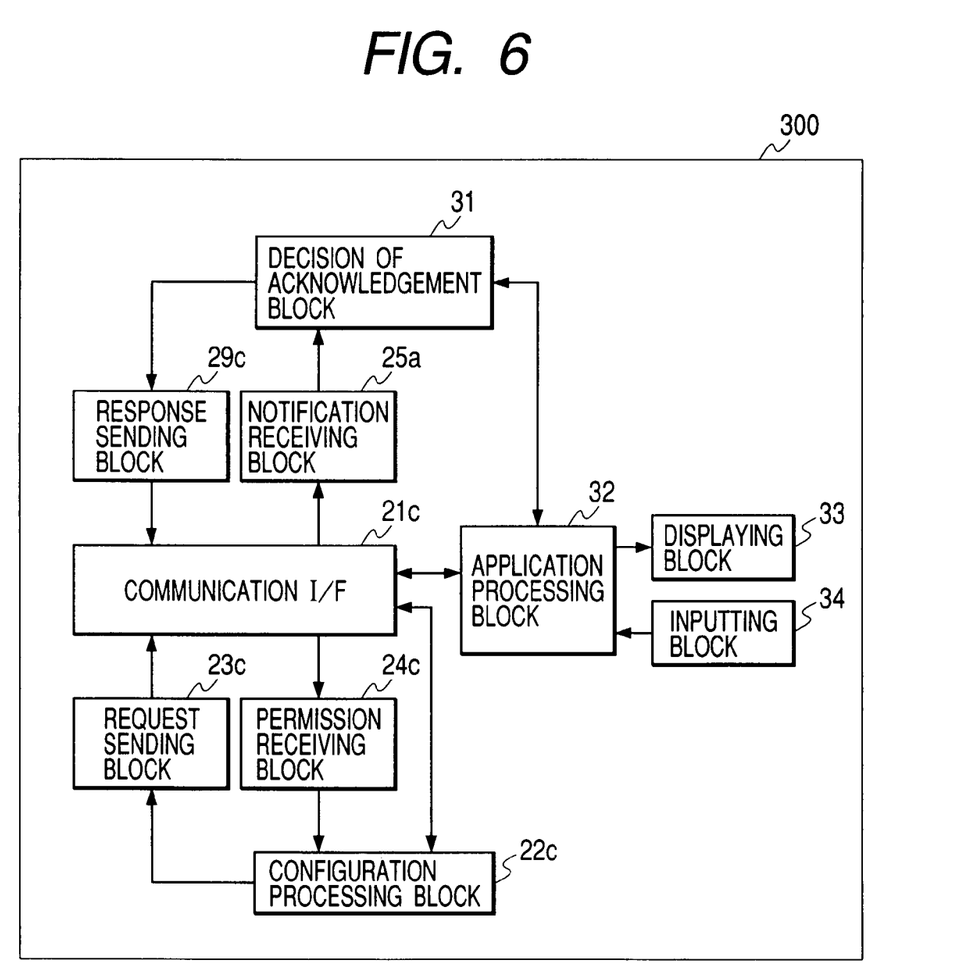
FIG. 6 is a block diagram of a network device in the second embodiment of the present invention.

While the network access media for connecting the network devices to each another is a wireless LAN in FIG. 1, the wireless LAN may be replaced with another LAN that uses twisted pair cables, or a network that uses power or telephone lines. FIG. 6 shows a block diagram of a network device in a second embodiment of the present invention. In the network device 300 shown in FIG. 6, the blocks denoted by reference symbols 21c to 25c and 29c are the same as those of the network device shown in FIG. 1, which are denoted by 21a to 25a and 29a. The decision for acknowledgement block 31 in the network device 300 notifies the user that an application processing block 32 has received a connection request from another network device, here by displaying the message on the screen of the displaying block 32. The decision for acknowledgement block 32 then receives a response inputted by the user through the inputting block 34 and the application processing block 32, then transfers the response to the gateway device.

The network device can share the displaying block and the inputting block with the application processing block shown in FIG. 6, whereby the network device can obtain the same benefits as those of the network device shown in FIG. 1, without providing dedicated displaying means or special inputting means.

As described above, according to the present invention, a new network device can be connected to a network with a simple operation. In addition, if any new device unknown to the user is to be connected unexpectedly to the network, either by mistake or intentionally, a notification regarding the attempted connection is sent to the user through each network device connected to the network, such that the user can view the message at any of these devices so that the unexpected connection can be prevented.

What is claimed:

1. A network connection management apparatus device, the device comprising:
a permission determining unit of the device, configured to receive a network connection request from a first network apparatus, to determine whether the requested connection is permitted, and to transmit permission information to the first network apparatus over a network to which the network connection management apparatus is connected, when it is determined that the requested connection is permitted;
a display unit of the device, configured to display to a user of the network connection management apparatus that the connection request received from the first network apparatus is being processed;
an input unit of the device, configured to receive a user input responsive to information about the connection request displayed on the display unit, the user input comprising a first confirmation;
a memory unit of the device, configured to store address information of a second network apparatus already connected to the network;
a notification transmitting unit of the device, configured to transmit, using the address information of the second network apparatus stored in the memory unit, a confirmation request over the network to the second network apparatus comprising a notification of the connection request received from the first network apparatus, the confirmation request inviting a confirmation response from the second network apparatus, the confirmation response from the second network apparatus comprising a second confirmation; and
a response receiving unit of the device, configured to receive the confirmation response from the second network apparatus,
wherein said permission determining unit transmits the permission information to the first network apparatus with address information for the first network apparatus, in response to receiving said user input representing the first confirmation at the input unit or in response to receiving the second confirmation from the second network apparatus at the response receiving unit.

2. A network connection management apparatus according to claim 1, wherein said permission determining unit transmits a notification for completion of user acknowledgement in response to receiving said user input representing the first confirmation at the input unit, or cancels the display of the connection request on the display unit in response to receiving the second confirmation from the second network apparatus at the response receiving unit.

3. A network connection management system comprising a network connection management apparatus in data communication with a first network apparatus and a second network apparatus over a network,
wherein said network connection management apparatus comprises a computing device that is configured for connection to the network and further comprises:
a permission determining unit configured to receive from the first network apparatus a network connection request, to determine whether the requested connection is permitted, and to transmit permission information to the first network apparatus over the network, when it is determined that the requested connection is permitted;
a display unit configured to display to a user that the connection request received from the first network apparatus is being processed at the network connection management apparatus;
an input unit configured to receive a user input responsive to information about the connection request displayed on the display unit, the user input comprising a first confirmation;
a memory unit configured to store address information of the second network apparatus already connected to the network;

a notification transmitting unit configured to transmit, using the address information of the second network apparatus stored in the memory unit, a confirmation request to the second network apparatus comprising a notification that the connection request is received from the first network apparatus, the confirmation request inviting a second confirmation response from the second network apparatus; and a response receiving unit configured to receive the second confirmation response from the second network apparatus;

wherein the first network apparatus comprises:

a request transmitting unit configured to transmit the network connection request to the network connection management apparatus;

a permission receiving unit configured to receive the permission information with address information from the network connection management apparatus;

a configuration processing unit configured to use the address information as an address of the first network apparatus so as to enable the first network apparatus to communicate on the network;

wherein said second network apparatus comprises:

a notification receiving unit configured to receive the confirmation request from the network connection management apparatus; and a response transmitting unit configured to transmit the second confirmation response to the network connection management apparatus, and wherein the permission determining unit of said network connection management apparatus transmits the address information and the permission information to the first network apparatus either when receiving the first confirmation at the input unit, or when receiving the second confirmation response from the second network apparatus.

4. A network connection management system according to claim 3, wherein said permission determining unit transmits a notification for completion of user acknowledgement in response to receiving said user input representing the first confirmation at the input unit, or cancels the display of the connection request on the display unit in response to receiving the second confirmation response from the second network apparatus at the response receiving unit.

* * * * *